Patented Jan. 23, 1923.

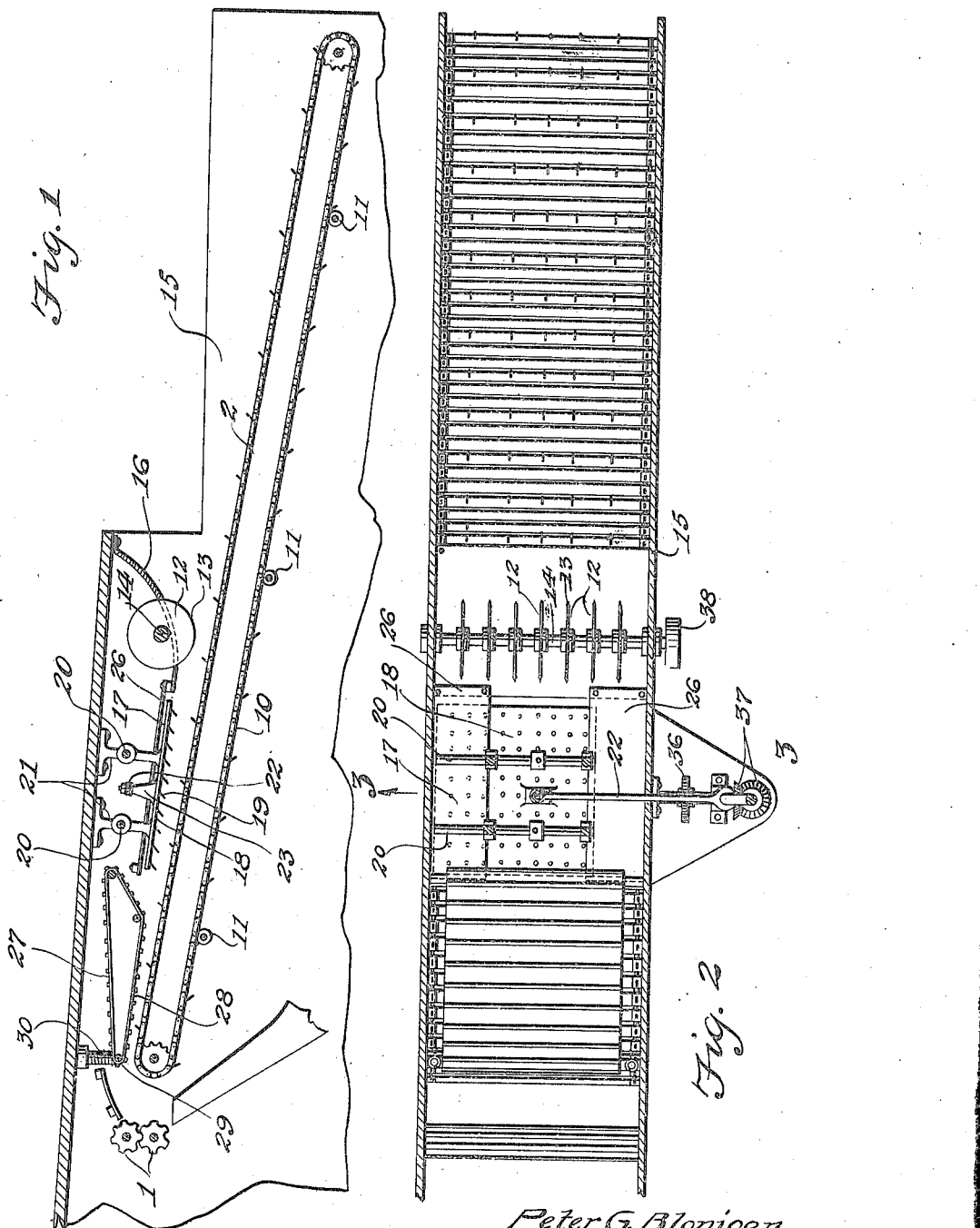

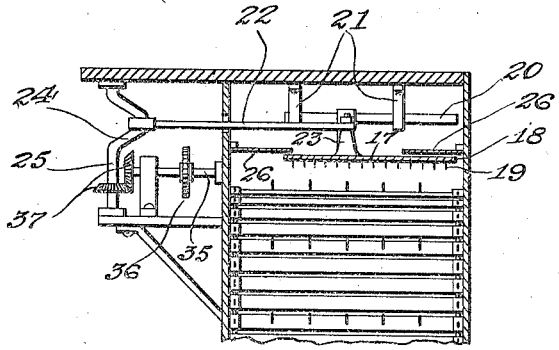
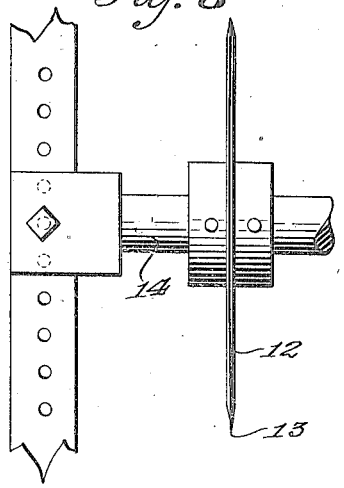
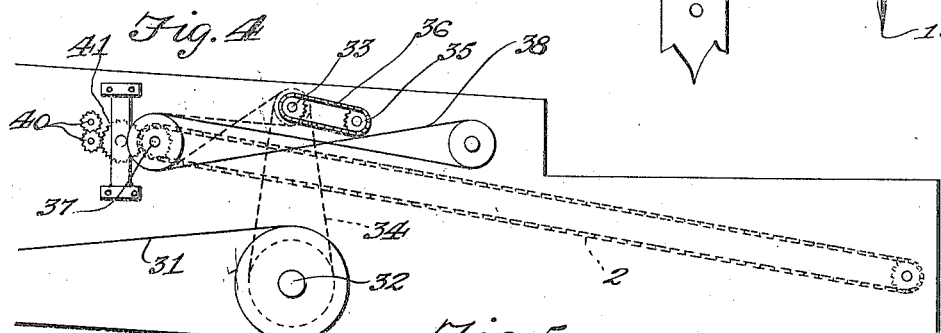
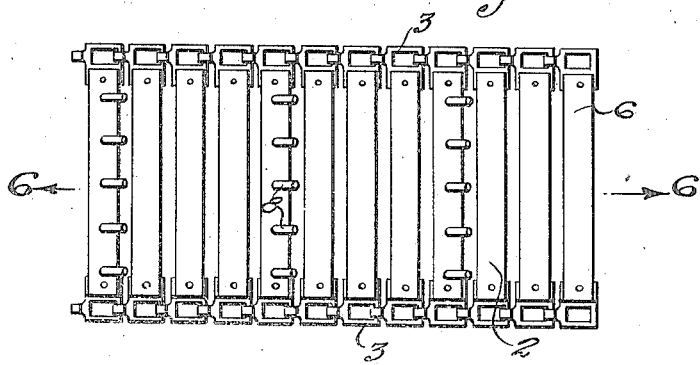
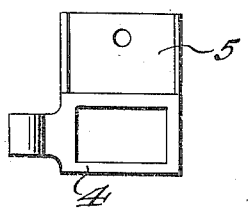
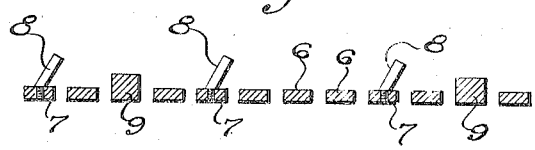

1,443,206

UNITED STATES PATENT OFFICE.

PETER G. BLONIGEN, OF ROSCOE, MINNESOTA.

SELF-FEEDER FOR CORN SHREDDERS.

Application filed March 6, 1922. Serial No. 541,482.

*To all whom it may concern:*

Be it known that I, PETER G. BLONIGEN, a citizen of the United States, residing at Roscoe, in the county of Stearns and State of Minnesota, have invented new and useful Improvements in Self-Feeders for Corn Shredders, of which the following is a specification.

This invention relates to agricultural implements and more particularly to a self feeder for use in connection with corn shredders, and an object of the invention is to provide a feeder mechanism which will feed the corn stalks to the shredding mechanism, evenly, spreading the various stalks in the bundles so as to prevent piling up of the stalks and the resulting stalling of the shredding machinery or mechanism, and also to provide a feeder mechanism which embodies suitable cutters for cutting twine used in tying the bundles of corn stalks together when shocked.

Another object of this invention is to provide a self feeder mechanism for use in connection with corn shredders or analogous structures which embodies a shaker or spreader member which moves transversely of the line of travel of the stalks spreading them out in flatwise relation to prevent choking of the shredder mechanism and which further provides a yieldably supported feeding conveyor cooperating with the main feeding conveyor for feeding the stalks to the snapping roll in relatively compact relation.

Other objects of the invention will appear in the following detailed description taken in connection with the accompanying drawings wherein:

Fig. 1 is a longitudinal section through the improved self feeder mechanism.

Fig. 2 is a top plan of the self feeder mechanism.

Fig. 3 is a cross section taken on the line 3—3 of Fig. 2.

Fig. 4 is a side elevation of the self feeder mechanism illustrating the driving chains and belts.

Fig. 5 is a fragmentary top plan of the feeding conveyor.

Fig. 6 is a longitudinal section on the line 6—6 of Fig. 5.

Fig. 7 is a detail view of one of the links of the chain structure.

Fig. 8 is a detail view illustrating one of the twine cutters.

Referring more particularly to the drawings, the improved self feeder comprises in combination with the snapping rolls 1 of a corn shredder or analogous structure, an endless conveyor 2 upon which the bundles of corn stalks are placed and which comprises a pair of spaced chains 3 each composed of a plurality of links 4 having transverse flight supporting projections 5 formed thereon to which the flights 6 are attached. At spaced intervals, certain of the flights namely the flights 7 have feed fingers or spurs 8 attached thereto which incline slightly in the direction opposite to the direction of travel of the conveyor, the said prongs being provided for engaging the corn stalks and carrying them along with the movement of the conveyor. Also at spaced intervals in the conveyor construction, relatively thick flights 9 are provided which are substantially twice as thick as the ordinary flight 6, as clearly shown in Fig. 6 of the drawings, the said flights 9 cooperating in the efficient conveying of the corn stalks. The lower run 10 of the conveyor 2 is supported by suitable spaced supporting rollers 11 to prevent excessive sagging thereof. During the passage of the bundles of corn stalks upwardly with the upper run of the conveyor 2, the binder twine with which the bundles are tied is cut by rotary twine cutters 12 which are provided in the form of discs having cutting edges 13 at their perimeters. The discs 12 are mounted upon a shaft 14 which extends transversely of the supporting frame 15 of the feeder mechanism and any desired number of cutting discs may be provided. A guard 16 is provided to prevent the throwing of pieces of twine or of the corn stalks upwardly by the rotation of the discs 12.

After the stalks leave the cutters 12 they are engaged and spread laterally over the upper run of the conveyor 2 by the spreader 17 which comprises a plate 18 having a plurality of stalk engaging tines 19 carried thereby which incline in the direction of travel of the stalks, as clearly shown in Fig. 1 of the drawings. The plate 18 is slidably supported upon suitable guide rods 20 which are in turn supported by suitable hangers 21. A pitman 22 is connected to the plate 18 by means of the projection 23 and the said pitman is connected to the wrist pin of the crank 24 of the crank shaft 25 which rotates transversely to the direction of travel of the conveyor 2 and consequently moves the spreader 17 back and forth transversely of the direction of travel of the conveyor for spreading the stalks evenly and in flatwise relation over the conveyor. Guard plates 26 are provided for preventing any of the stalks of corn from getting on top of the spreader 17 and interfering with the proper operation thereof.

An auxiliary feeding conveyor 27 is provided the lower run 28 of which travels in close proximity to the upper run of the conveyor 2 cooperating with the conveyor 2 in feeding stalks of corn to the snapping roll 1. The supporting shaft 29 at the inner end of the conveyor 27 is yieldably supported by means of springs 30 so as to permit it to yield relative to the upper run of the conveyor 2 in case relatively heavy corn is being fed through the feeder.

Suitable power transmitting mechanism may be provided for operating the various movable parts of the self feeder, and such transmission is illustrated diagrammatically in Fig. 4 of the drawings, where the power is taken from any suitable power source such as a tractor, engine, or the like by the belt 31 which transmits it to the shaft 32 from which the various other driving belts are driven as for instance the shaft 33 which drives the auxiliary apron or conveyor 27 is connected to the shaft 32 by suitable power transmitting mechanism 34, and the shaft 33 is connected with the driving shaft 35 by suitable power transmitting mechanism 36 such as sprockets and a chain. The shaft 35 is connected through the medium of bevel gears 37 with the crank shaft 25 for operating the shaker or spreader 17. The shaft 14 may be driven from the driving shaft 37′ of the conveyor 2 by a suitable crossed belt and pulley transmitting structure 38, and the snapping roll driving shafts 40 may also be driven from the shaft 37′ by a suitable chain of gears as indicated at 41 if it is so desired.

From the foregoing description taken in connection with the accompanying drawings it will be apparent, that with the improved self feeder mechanism heretofore described and illustrated in the drawings, that choking down of the shredder mechanism will practically be eliminated in that the stalks will be fed evenly to the shredder mechanism, and also that the binder twines will be evenly cut so as to prevent bunching of the stalks during the feeding operation and that with the use of the improved self feeder, manually feeding will be entirely eliminated and the consequent dangers contingent therewith.

It is, of course, to be understood that the invention may be constructed in other manners and the parts associated in other relations and, therefore, I do not desire to be limited in any manner except as set forth in the claims hereunto appended.

Having thus described my invention what I claim is:

1. In a self feeder mechanism, a feeding conveyor, a spreader comprising a plate, a plurality of spreading tines depending from said plate and inclined in the direction of travel of the conveyor, means connected to said plate for moving it transversely of the direction of travel of the conveyor, and guard plates at the ends of said plate for preventing material from passing from the conveyor upon said spreader plate.

2. In a self feeder mechanism, a feeding conveyor, a spreader structure comprising a plate, a plurality of spreading tines carried by said plate, guide rods carried by said plate, guides for receiving said rods and supporting said plate, and means connected to said plate for moving it transversely of the direction of travel of said feeding conveyor.

3. In a self feeder mechanism, a feeding conveyor, a spreader for spreading material over said conveyor, means for moving said spreader transversely of the direction of travel of the conveyor, guide rods carried by the spreader, supporting brackets receiving said guide rods for guiding and supporting said spreader during movement.

4. In a self feeder mechanism, a feeding conveyor, a spreader for spreading material over said conveyor, means for moving said spreader transversely of the direction of travel of the conveyor, guide rods carried by the spreader, supporting brackets receiving said guide rods for guiding and supporting said spreader during movement, a plurality of rotatable twine cutting discs, a guard for said discs, and guard plates attached to said first named guard and extending over the ends of said spreader structure for preventing material passing from the conveyor above the spreader.

In testimony whereof I affix my signature.

PETER G. BLONIGEN.